United States Patent [19]
Zucchini et al.

[11] Patent Number: 5,922,632
[45] Date of Patent: *Jul. 13, 1999

[54] VANADIUM BASED COMPONENTS AND CATALYSTS FOR THE POLYMERIZATION OF OLEFINS AND POLYMERIZATION PROCESSES USING THE SAME

[75] Inventors: Umberto Zucchini, deceased, late of Ferrara, by Maria Stagni, Silvia Zucchini, Chiara Zucchini, Matteo Zucchini, heirs; Tiziano Dall'Occo; Antonella Angelini, both of Ferrara, all of Italy

[73] Assignee: Montell Technology Company b.v., Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/936,888

[22] Filed: Sep. 25, 1997

Related U.S. Application Data

[63] Continuation of application No. 08/599,286, Feb. 9, 1996, abandoned, which is a continuation of application No. 08/106,917, Aug. 16, 1993, abandoned.

[30] Foreign Application Priority Data

Aug. 18, 1992 [IT] Italy .................................. MI92A1996

[51] Int. Cl.$^6$ ....................................................... C08F 4/20
[52] U.S. Cl. ......................... 502/125; 502/128; 502/133; 526/124.7; 526/124.8; 526/125.2; 526/125.6; 526/125.7; 526/143; 526/144
[58] Field of Search ..................... 502/125, 128, 502/133; 526/124.7, 124.8, 125.2, 125.6, 125.7, 143, 144

[56] References Cited

U.S. PATENT DOCUMENTS

| | | |
|---|---|---|
| 3,494,728 | 2/1970 | Letson et al. . |
| 3,953,414 | 4/1976 | Galli et al. . |
| 4,399,054 | 8/1983 | Ferraris et al. . |
| 4,438,019 | 3/1984 | Durand et al. ............................ 502/169 |
| 4,469,648 | 9/1984 | Ferraris et al. . |
| 4,634,751 | 1/1987 | Best ........................................ 526/129 |
| 4,808,387 | 2/1989 | Datta et al. .............................. 423/265 |
| 4,871,523 | 10/1989 | Datta et al. .............................. 423/265 |

FOREIGN PATENT DOCUMENTS

| | | |
|---|---|---|
| 0 155 770 | 9/1985 | European Pat. Off. . |
| 0 188 099 | 7/1986 | European Pat. Off. . |
| 0 291 361 | 11/1988 | European Pat. Off. . |
| 0 395 083 | 10/1990 | European Pat. Off. . |
| 0 436 325 A1 | 7/1991 | European Pat. Off. . |
| 0 449 673 | 10/1991 | European Pat. Off. . |
| 0 488 856 | 6/1992 | European Pat. Off. . |
| 2 235 926 | 3/1991 | United Kingdom . |

OTHER PUBLICATIONS

Inorganic Synthesis, vol. 4, p. 128, McGraw Hill Publ. Ltd., 1953.
I.W. Parsons, Polymer, 1989, vol. 30, p. 1336.

*Primary Examiner*—David W. Wu
*Attorney, Agent, or Firm*—Bryan Cave LLP

[57] ABSTRACT

Catalysts component of the (co)polymerization of alpha-olefins $CH_2=CHR$, wherein R is hydrogen or an alkyl radical having from 1 to 8 carbon atoms, comprising a product of the composition:

$$VCL_y \cdot z(b)$$

wherein (b) represents an organic compound selected from alkyl, aryl and acyl halides, y is a number higher than 2 and lower than 4, and preferably comprised between 2.5 and 3.5 and z is a number higher than zero and lower than or equal to 2, and preferably between 0.002 and 1. Components can be obtained as products of the reaction, carried out at temperatures higher than 10° C., between $VCl_4$ and the compound (b). Particularly preferred among compounds (b) are benzoyl chloride, p-methoxybenzoyl chloride and p-chloro benzoyl chloride. From the components of the invention, either supported or not, catalysts having high activity particularly useful for the production of ethylene polymers showing broad molecular weight distribution can be prepared.

14 Claims, No Drawings

VANADIUM BASED COMPONENTS AND CATALYSTS FOR THE POLYMERIZATION OF OLEFINS AND POLYMERIZATION PROCESSES USING THE SAME

This is a continuation of U.S. application Ser. No. 08/599,286 filed Feb. 9, 1996, now abandoned, which was a continuation of U.S. application Ser. No. 08/106,917, filed Aug. 16, 1993, now abandoned.

The present invention relates to components of catalysts based on vanadium compound for the polymerization of alpha-olefins $CH_2=CHR$, wherein R is hydrogen or an alkyl radical having 1–8 carbon atoms, to the catalysts obtained therefrom and to their use in processes for the (co) polymerization of olefins.

It is known that the use of catalysts from vanadium compounds in processes for the preparation of olefinic polymers shows some advantages, such as for instance a fairly wide molecular weight distribution in case of polyethylene and a good distribution of comonomers in products deriving from copolymerization processes. Among the vanadium compounds which can be used, one of the more common is $VCl_3$.

It is known that $VCl_3$ can be obtained by thermal decomposition of $VCl_4$. In fact, vanadium tetrachloride is not very stable and tends to decompose according to the reaction:

$$VCl_4 \rightarrow VCl_3 + \tfrac{1}{2}Cl_2$$

For this reason, $VCl_4$, in particular when it has to be used in the preparation of catalysts for the polymerization of olefins, is stabilized, for example by chlorinated hydrocarbons (U.S. Pat. No. 3,494,728).
Other compounds having a stabilizing effect on $VCl_4$ are the acyl halides either mono or di-functional, in particular benzoyl chloride and phthaloyl chloride (EP-291,361).

However, in order that the conversion of $VCl_4$ to $VCl_3$ is substantially complete, the reaction has to be carried out at high temperature and for very long periods of time; typically the decomposition is carried out at 160–170° C. for a period of time of about 50 hours (INORGANIC SYNTHESIS, vol. 4, Page 128, McGRAW-HILL Publ. Ltd., 1953).

As a result of the drastic conditions requested, the reduction of $VCl_4$ is generally carried out chemically.

Patent Application EP-A-155770 describes vanadium catalysts obtained by precipitation of $VCl_4$ on a support essentially consisting of $MgCl_2$ containing Mg—C bonds. The support is prepared by halogenation of a dialkylmagnesium in the presence of an ether; the halogenation is carried out in such a way to leave some remaining Mg—C bonds. By heating at temperatures comprised between 20 and 50° C. and by the reducing effect of Mg—C bonds the $VCl_4$ is partially reduced and precipitated on the support. Under these conditions only a fraction of the $VCl_4$ used is reduced and remains fixed on $MgCl_2$.

Another method for preparing catalysts from vanadium compounds which involves chemical reduction of $VCl_4$ is described by I. W. Parsons (Polymer, 1989, Vol. 30, page 1336). The reduction is carried out by reaction of $VCl_4$ with $MgR_2$ or $BrMgR$, thus obtaining essentially $VCl_3$ supported on $MgCl_2$. Yields in ethylene polymerization which are reported are very low.

Now it has now been found that it is possible to obtain catalyst components highly active in alpha-olefins polymerization by decomposing $VCl_4$ in the presence of suitable organic compounds.

Surprisingly it has been found that organic compounds particularly effective in favouring the reduction of $VCl_4$ are halogenated organic compounds, and especially organic acids halides, previously described as stabilizers for $VCl_4$.

Catalyst components of the invention comprise the product of the reaction between:

(a) $VCl_4$; and (b) and organic compound selected from alkyl, aryl and acyl halides, either aromatic or aliphatic.

Components thus obtained give, by reaction with organometallic derivatives of aluminium (cocatalysts), catalysts having high activity in the polymerization and copolymeration of alpha-olefins $CH_2=CHR$, wherein R is hydrogen or an alkyl radical having from 1 to 8 carbon atoms. Such catalysts are particularly suitable for the polymerization of ethylene and its mixtures with alpha-olefins $CH_2=CHR'$, wherein R' is an alkyl radical having from 1 to 8 carbon atoms, in particular with propylene, butene-1, pentene-1, 4-methylpentene-1, hexene-1 and octene-1.

Catalysts of the invention can also be advantageously used to prepare saturated elastomeric copolymers of ethylene and alpha olefins $CH_2=CHR'$ and unsaturated elastomeric copolymers of ethylene with said alpha olefins and with minor quantities of a diene.

Preferred organic compounds (b) are acyl halides of aromatic mono- or polycarboxylic acids, for example benzoyl chloride (BC) and substituted benzoyl chlorides, such as p-chloro-benzoyl chloride (p-chloro-BC), p-methoxybenzoyl chloride (p-Methoxy-BC) and phthaloyl chloride. Particularly preferred are BC and p-Methoxy-BC.

Advantageously useable are also acyl halides of aliphatic mono-or polycarboxylic acids, for example trimethyl acetylchloride (pivaloyl chloride). Examples of other useable compounds are alkyl and aryl halides such as n-butylperchloro-crotonate (nBPCC), chloroform, ethyltrichloro acetate (ETA) and α, α, α-trichlorotoluene.

The reaction between compounds (a) and (b) can be carried out directly in the compound (b), or in an aliphatic or aromatic hydrocarbon solvent, preferably having a boiling temperature higher than 50° C., for example heptane, decane or toluene.

Profitably, the reaction is carried out at temperatures above 10° C., preferably above 50° C. and in particular comprised between 70 and 130° C. Generally, reaction times of more than 1 hour are necessary in order to obtain the catalytic components of the invention; preferably, reaction times of between 3 and 10 hours are used.

Compounds (a) and (b) are allowed to react in quantities corresponding to molar ratios compound (b)/V of lower than 100, preferably comprised within the range from 0.1 to 30 and in particular from 0.3 to 10, in the presence of a hydrocarbon solvent such as hexane, heptane or toluene. The concentration of $VCl_4$ in the reaction mixture is comprised between 0.01 and 3 mols/l.

The product which is obtained from the reaction has a composition which can be generally defined by the formula:

$$VCl_y \cdot z(b)$$

wherein (b) represents the compound (b), y is a number higher than 2 and lower than 4, and preferably comprised within the range from 2.5 to 3.5, and z is a number higher than zero and lower than or equal to 2, and preferably comprised within the range from 0.002 to 1.

As previously said, catalyst components thus obtained give by reaction with organometallic derivatives of aluminium (cocatalysts), catalysts having high activity in the polymerization and copolymerization of alpha-olefins $CH_2=CHR$.

Organometallic derivatives of aluminium useable as cocatalysts are for example aluminium trialkyls, aluminium alkyl monohydrides, Al-dialkylmonoalkoxyde, Al-dialkylmonochlorides and Al-alkyl sesquihalides. Typical examples are the triethyl aluminium (AlEt$_3$ or TEAL), triisobutyl aluminium (TIBAL), tri-n-butyl aluminium, tri-n-hexyl aluminium (TNHA), tri-n-octyl aluminium, Al(OEt)Et$_2$, AlEt$_2$Cl(DEAC) and Al$_2$Et$_3$Cl$_3$. Preferred Al-alkyl compounds are aluminium trialkyls, in particular TIBAL, TNHA and TEAL.

The molar ratio between the organometallic derivative of aluminium and the vanadium compound is generally comprised between 5 and 500 and preferably between 10 and 100.

The activity of catalysts obtained from catalytic components of the invention can be further increased using a known promoter, selected for example among halogenated organic compounds, such as saturated or unsaturated aliphatic halogenated hydrocarbons, and esters of saturated and unsaturated halogenated carboxylic acids. Promoters typically used are for example CHCl$_3$, CH$_2$Cl$_2$, CCl$_4$, CFCl$_3$, CF$_2$ClCCl$_3$, ethylchloro acetate and n-butylperchlorocrotonate. CHCl$_3$ is the preferred promoter.

The promoter is used in such a quantity to have a molar ratio promoter/vanadium between 1 and 150, preferably between 5 and 60.

The (co)polymerization can be carried out in liquid phase (in solvent or liquid monomer) or in gaseous phase. Examples of useable solvents are aliphatic hydrocarbons such as hexane, heptane and decane. It is possible to work at temperatures comprised generally between 0 and 200° C., preferably between 50 and 95° C., and at normal pressure or under pressure.

The average molecular weight of the (co)polymer can be controlled using suitable quantities of hydrogen in the polymerization. Catalysts obtained from the catalytic components of the invention are rather sensitive to the hydrogen concentration, so that small changes of the partial pressure of hydrogen generally produce large variations of the average molecular weight.

(Co)polymers obtained show a rather wide distribution of molecular weights, generally characterized by ratios F/E higher than 90 for values of E equal to or higher than 0.1. The ratio F/E, between the melt index F (ASTM D-1238-Condition F), and the melt index E (ASTM D-1238-Condition E) is a measure of the width of the distribution of molecular weights and the value E is indicative of the average molecular weight.

In a particular aspect, the invention is also concerned with the preparation of supported catalyst components, which allow catalysts highly active in the polymerization of alpha olefins to be obtained. This preparation is carried out by allowing the reaction to take place between compounds (a) and (b) in the presence of the support.

The support may or may not have a regular morphology. Supports having regular morphology are for example described in U.S. Pat. No. 4,469,648 and in patent applications EP-A1-0,449,673 and EP-A1-0,488,856.

The preferred support is MgCl$_2$ in spheric form, that is in form of particles characterized by ratios between the greater axis and the smaller axis lower than 1.5 and preferably lower than or equal to 1.3.

Catalysts obtained from supported spherical components of the invention allow an effective control in the polymerization and therefore are particularly suitable to modern processes of polymerization either in suspension (using a solvent or the monomer as liquid phase) or in gaseous phase.

Furthermore, advantageously the (co)polymers obtained do not need to be pelletized before undergoing moulding processes.

The spherical support can be prepared from hydrated magnesium dichloride, especially MgCl$_2$.6H$_2$O, obtained in spherical form according to the method described in U.S. Pat. No. 3,953,414. According to an alternative method, the support can be prepared in spherical form from MgCl$_2$-electron donor compound adducts, according to processes described in U.S. Pat. Nos. 4,469,648 and 4,399,054, here included as reference, or by spray drying from a MgCl$_2$ solution according to known techniques.

Particularly preferred is the preparation of spherical supports starting from an adduct of MgCl$_2$ with an electron donor compound containing active hydrogen atoms, such as alcohols, phenols or water, for example according to the method described in patent application EP-A-0,395,082. Preferred electron donor compounds are alcohols, in particular ethyl alcohol.

Preferably, before the reaction between compounds (a) and (b), the spherical adducts of MgCl$_2$ with the alcohol are partially dealcoholated until a residue alcohol content lower than 40% by weight, and preferably lower than 10% by weight, is obtained. The dealcoholation can be carried out physically, for example in fluid bed heated under nitrogen stream, or chemically, by reaction with a suitable aluminium organo metal compound such as AlEt$_3$. Adducts can be dealcoholated also by a combination of the two above mentioned methods.

In order to prepare catalyst components of the invention, the partially dealcoholated support thus obtained, dispersed in an aliphatic hydrocarbon (hexane, heptane, etc.), is treated with a VCl$_4$ solution and subsequently with a solution of the organic compound (b).

The treatment with VCl$_4$ is carried out at a temperature lower than 50° C. and preferably comprised between 15 and 30° C., for periods generally longer than 30 minutes.

The reaction between compounds (a) and (b) is carried out at temperatures above 10° C. and preferably between 50 and 130° C. The reaction time is generally longer than 1 hour and preferably comprised between 3 and 10 hours. Molar ratios compound (b)/V are as previously defined.

The percent content of vanadium in catalyst components obtained can vary from 0.5 to 15% by weight and is preferably comprised between 2 and 7% by weight.

As previously indicated, in the polymerization an aluminium alkyl compound is generally used as cocatalyst, preferably an aluminium trialkyl, such as for example TIBAL or TNHA. The ratio Al/V used may vary from 5 to 500, and is preferably comprised between 100 and 400.

The use of a promoter of known type, such as those previously indicated, allows an increasing in the activity of the catalyst in the polymerization. The quantity of promoter used generally corresponds to a promoter/V ratio of between 1.5 and 150, preferably between 30 and 120.

EXAMPLES

The following examples are given to illustrate and not to limit invention.

In examples, all the synthesis operations and handling of the used substances (transfers, filtrations, dryings) are carried out under anhydrous nitrogen. Solvents commonly used as dispersing agent (hexane, heptane, toluene) are distilled on lithium aluminium hydride or on anhydrous MgCl$_2$ and are kept on activated molecular sieves (4 Å).

The composition of catalyst components exemplified has been determined by the following known methods:

V, Mg and Al: atomic absorption after dissolution in aqueous sulfuric acid.

Cl: potentiometric titration with silver nitrate after dissolution in aqueous sulfuric acid.

compound (b) and solvents: treatment with methanol and $NH_4OH$, and subsequent gas-chromatografic analysis.

As to the polymerization products, measures of melt index E, F and P have been carried out at 190° C. according to ASTM-D-1238, Condition E (2.16 kg), F (21.6 kg) and P (5 kg) respectively. The intrinsic viscosity has been determined in tetrahydronaphthalene (THN) at 135° C.

Example 1

In a 500 ml four necked flask, equipped with mechanical stirrer, reflux condenser and thermometer, after degassing under anhydrous nitrogen and always keeping the apparatus under anhydrous nitrogen, 37 ml of distilled heptane were introduced at room temperature, and thereafter, while stirring, 15 ml (0.137 mols) of vanadium tetrachloride (97% $VCl_4$) were added.

Over 20 minutes distilled benzoyl chloride (80 ml–0.689 mols) was added and than over one hour the temperature was raised to 90° C. and this temperature was maintained for 5 hrs. The dark suspension obtained was left to settle at 40° C. and then was filtered off. The solid residue was washed six times in anhydrous hexane and was dried at 30° C. under vacuum (20 mmHg).

16 g of brown powder, containing 30.8% by weight of vanadium, 66.6% chlorine, 0.8% benzoyl chloride and solvent quantities=1.7% (Table 1) was obtained.

Example 2–13

The preparation method reported in example 1 was followed. Type and quantities of reagents and composition of catalyst components obtained are indicated in Table 1.

Example C1 (Comparison)

In a 250 ml four necked flask, equipped with mechanical stirrer, reflux condenser and thermometer, after degassing under anhydrous nitrogen and keeping always the apparatus under anhydrous nitrogen, 75.8 ml of distilled heptane were introduced at room temperature and thereafter, while stirring, 15 ml (0.137 mols) of vanadium tetrachloride (97% $VCl_4$) were added.

Thereafter, over one hour the temperature was raised to 90° C. and this temperature was maintained for 5 hrs. The dark suspension obtained was left to settle at 40° C. and was filtered off. The solid residue was washed six times in anhydrous hexane and was dried at 30° C. under vacuum (20 mmHg).

6.8 g of dark violet powder were obtained containing, by weight, 28.1 vanadium, 65.7 chlorine and 1% solvents (Table 1).

Examples 14–45
Polymerization of ethylene in hexane suspension

A 2.5 litres stainless steel autoclave, equipped with magnetic stirrer (700 rpm), manometer, temperature indicator, catalyst feeding vessel, feeding lines for ethylene and hydrogen and forced circulation thermostatic jacket was used.

The autoclave was degassed by a 75–80° C. nitrogen flow for 1 hour, thereafter ethylene was allowed to flow for about 30 minutes and 3–4 washings with hydrogen were carried out. The catalytic system was separately prepared in a little 100 ml tailed flask (equipped with dropping funnel), by mixing 50 ml anhydrous hexane with the suitable quantity of catalytic component and optionally, where indicated in Tables 2 and 3, chloroform as promoter. Further 50 ml anhydrous hexane, placed in the dropping funnel, were used for washing the flask. After having cooled the autoclave to 40° C., under hydrogen, anhydrous hexane (900 ml), added with the selected type and quantity of aluminium alkyl, was fed. The temperature was brought up to polymerization conditions. Hydrogen was added up to the desired pressure ($p_h$) and ethylene up to 80% of the polymerization pressure. The catalytic system was fed in the catalyst feeding vessel and, under ethylene pressure, was introduced into the autoclave thus reaching the selected ethylene pressure ($p_E$).

The test was carried out by keeping the temperature (T) constant, by thermostating with water and steam; the ethylene pressure was kept constant by continuous feeding, always under constant stirring. After the prefixed time (120 minutes in Examples here reported), the ethylene flow was interrupted, the reactor was cooled and the residue pressure was degassed; the autoclave was opened and the discharged polymer was filtered and dryed in oven at 60° C. under nitrogen stream.

Table 2 and 3 report the characteristics of the catalytic system, polimerization conditions and yields and characteristics of the products obtained.

Example 46
Preparation of the support

An magnesium chloride-alcohol adduct, prepared according to the method described in U.S. Pat. No. 4,399,054 and containing about 3 mols of alcohol for each mol of $MgCl_2$, was thermally treated until it had an ethanol content equal to about 37% by weight.

300 g of this support were fed in a 5 l. reactor in suspension with 3 l. of anhydrous hexane. Whilst stirring at room temperature, 120 g of $AlEt_3$ in hexane solution were fed. The mixture was heated at 69° C. and was kept under stirring for 60 minutes; the stirring was then stopped, the mixture was left to settle and the liquid phase was separated. The treatment with $AlET_3$ was repeated a further 2 times under the same conditions. The support was then washed with hexane and dried at 50° C.; the content of residue alcohol was equal to 7.6%.

Preparation of the component of catalysts

At room temperature, 50 ml of distilled heptane and 10.7 g of this support were introduced in a 500 ml jacketed reactor, provided with mechanical stirrer, reflux condenser, thermometer and thermostat, degassed under anhydrous nitrogen and kept under an anhydrous nitrogen atmosphere. After 30 minutes a solution was added consisting of 1.4 ml (12.8 mmols) of $VCl_4$, (9.7%) and 12 ml of distilled heptane. The system was kept under stirring at room temperature for 30 minutes and then the suspension was left to settle and was filtered. The solid residue was suspended in distilled heptane (30 ml) and a solution consisting of distilled benzoyl chloride (3,72 ml–32 mmols) and distilled heptane (15 ml) was added dropwise over 20 minutes. The temperature was raised to 90° C. over one hour and was maintained constant for 5 hours. The dark suspension obtained was left to settle at 40° C. and was filtered off. The solid residue was washed six times in anhydrous hexane and was dried at 30° C. under vacuum (20 mmHg).

14.43 g of brown powder containing, by weight, 4.75% vanadium, 52.2% chlorine, 12.75% magnesium, 2.35% aluminium, 0.4% ethyl alcohol, 9.36% benzoyl chloride and 7% solvents, were obtained (Table 4).

Example 47

The component of catalysts was prepared according to the process described in Example 46, subtituting the benzoyl chloride with p-methoxy benzoyl chloride in a quantity corresponding to a molar ratio on the vanadium equal to 1 (Table 4).

Example 48

The support was prepared starting from the $MgCl_2$-ethyl alcohol adduct containing about 37% of alcohol obtained as described in example 46. Before the preparation of the catalyst component, the adduct was further dealcoholated by thermal treatment in fluid bed under nitrogen stream, at temperatures comprised between 50 and 150° C., until a residue EtOH content equal to 6% was obtained.

The preparation method of the component of catalyst was analogous to that of Example 46; type and quantity of reagents and composition of the obtained component are described in Table 4.

Examples 59–63

The polymerization of ethylene in the presence of catalysts prepared from the supported catalytic components was carried out by a process analogous to that reported in examples 14–45 (polymerization time=2 hours). Polymerization conditions and yields and characteristics of the products obtained are illustrated in Table 5.

TABLE 1

Preparation of Non-Supported Components of Catalysts

| Example | (b) | (b)/V mols/mol | Concentration $^gVCl_4$/l | Composition (% by weight) V | Cl | (b) | Solvents |
|---|---|---|---|---|---|---|---|
| 1 | BC | 5 | 200 | 30.8 | 66.6 | 0.8 | 1.7 |
| 2 | BC | 2.5 | 153 | 22.2 | 53.1 | 19.1 | <0.1 |
| 3 | BC | 1.0 | 200 | 33.2 | 64.5 | 0.1 | 0.5 |
| 4 | BC | 0.5 | 200 | 32.3 | 67.3 | <0.1 | <0.1 |
| 5 | p-chloro-BC | 5 | 200 | 31.0 | 66.5 | 0.8 | 0.1 |
| 6 | p-methoxy-BC | 5 | 127 | 17.3 | 48.5 | 28.6 | 0.3 |
| 7 | p-methoxy-BC | 1 | 200 | 29.5 | 61.5 | 4.8 | 0.3 |
| 8 | Pivaloyl chloride | 5 | 200 | 29.3 | 61.7 | 0.7 | 0.7 |
| 9 | Phthaloyl chloride | 5 | 193 | 29.7 | 62.0 | 5.4 | 0.4 |
| 10 | α, α, α trichlorotoluene | 5 | 200 | 27.9 | 38.6 | 0.6 | 0.2 |
| 11 | n-BPCC | 1 | 200 | 29.8 | 61.2 | 1.9 | 0.6 |
| 12 | Chloroform | 1 | 200 | 24.5 | 52.7 | 0.1 | 4.9 |
| 13 | ETA | 1 | 200 | 30.6 | 60.5 | 0.2 | 0.1 |
| C1 | — | — | 291 | 28.1 | 65.7 | — | 1.0 |

TABLE 2

Polymerization of ethylene by means of non-supported catalysts obtained by the component of catalysts of Example 1

| | | | | Polymerization data | | | | | Characteristics of the product | | | | |
|---|---|---|---|---|---|---|---|---|---|---|---|---|---|
| | | Al/V | $CHCl_3$/Al | $P_E$ | $P_H$ | T | Yield | | IV | E | F | | |
| Example | Al-alkyl | | mols/mol | bar | | ° C. | $g/g_{cal}$ | $g/g_vhr$ | dl/g | g/10 min | | F/E | F/P |
| 14 | TIBAL | 14 | — | 7.2 | 0.5 | 85 | 4550 | 7386 | 3.31 | — | 3.2 | — | 39 |
| 15 | TIBAL | 28 | — | 7.2 | 0.5 | 85 | 5030 | 8166 | 3.75 | — | 1.4 | — | 51 |
| 16 | TIBAL | 28 | — | 7.2 | 2.0 | 85 | 3480 | 5649 | 2.06 | 0.22 | 59 | — | 40 |
| 17 | TIBAL | 28 | 0.25 | 7.2 | 2.0 | 85 | 6660 | 10812 | 1.81 | 0.54 | 91 | — | 23 |
| 18 | TIBAL | 27 | 0.3 | 7.5 | 2.0 | 90 | 10000 | 16234 | 1.57 | 1.26 | 183 | — | 27 |
| 19 | TNHA | 13 | — | 7.2 | 1.0 | 85 | 5700 | 9253 | 2.60 | 0.06 | 15 | — | 35 |
| 20 | TNHA | 13 | — | 7.5 | 1.0 | 90 | 7180 | 11656 | 2.54 | 0.06 | 15 | — | 33 |
| 21 | TNHA | 28 | — | 7.5 | 1.0 | 90 | 7400 | 12013 | 2.67 | — | 15 | — | 33 |

TABLE 3

Polymerization of ethylene - Non supported catalysts (cocatalyst = TIBAL)

| Example | Component of catalysts from Example | Al/V mols/mol | $CHCl_3Al$ mols/mol | $P_E$ bar | $P_H$ bar | T °C. | Yield $g/g_{cat}$ | Yield $g/g_vhr$ | E g/10 min | F g/10 min | F/E | F/P |
|---|---|---|---|---|---|---|---|---|---|---|---|---|
| 22 | C1 | 14 | — | 7.2 | 0.5 | 85 | 2050 | 3648 | — | 3.1 | — | 44 |
| 23 | C1 | 13 | 2.0 | 7.2 | 1 | 85 | 1900 | 3381 | 0.12 | 24 | 200 | 33 |
| 24 | 2 | 35 | — | 7.5 | 1 | 90 | 4950 | 11174 | 0.38 | 46 | 122 | |
| 25 | 2 | 55 | 0.3 | 7.5 | 1 | 90 | 12800 | 28894 | 0.58 | 54 | 93 | |
| 26 | 3 | 38 | — | 7.5 | 1 | 90 | 5300 | 7994 | — | 15 | — | 36 |
| 27 | 3 | 33 | 0.2 | 7.5 | 1 | 90 | 13040 | 19668 | 0.14 | 24 | 171 | 32 |
| 28 | 4 | 39 | — | 7.5 | 1 | 90 | 5170 | 8016 | — | 11 | — | 38 |
| 29 | 4 | 42 | 0.2 | 7.5 | 1 | 90 | 15300 | 23721 | — | 8 | — | 31 |
| 30 | 5 | 29 | — | 7.5 | 1 | 90 | 3400 | 5484 | — | 7 | — | 29 |
| 31 | 5 | 34 | 0.2 | 7.5 | 1 | 90 | 8100 | 13065 | — | 14 | — | 26 |
| 32 | 6 | 48 | — | 7.5 | 1 | 90 | 7400 | 21449 | 0.7 | 48 | 69 | 17 |
| 33 | 6 | 98 | 0.2 | 7.5 | 1 | 90 | 14400 | 41739 | 0.9 | 64 | 71 | 23 |
| 34 | 7 | 26 | — | 7.5 | 1 | 90 | 6100 | 10357 | — | 12 | — | 31 |
| 35 | 7 | 48 | 0.2 | 7.5 | 1 | 90 | 13480 | 22886 | 0.14 | 18 | 127 | 25 |
| 36 | 9 | 20 | — | 7.5 | 1 | 90 | 3880 | 6587 | — | 7 | — | 29 |
| 37 | 9 | 25 | 0.2 | 7.5 | 1 | 90 | 5200 | 8829 | 0.2 | 23 | 128 | 28 |
| 38 | 10 | 31 | — | 7.5 | 1 | 90 | 3200 | 5745 | — | 25 | — | 43 |
| 39 | 10 | 56 | 0.2 | 7.5 | 1 | 90 | 7200 | 12926 | 0.37 | 65 | 177 | 27 |
| 40 | 11 | 26 | — | 7.5 | 1 | 90 | 4300 | 7215 | — | 7 | — | 23 |
| 41 | 11 | 37 | 0.2 | 7.5 | 1 | 90 | 6000 | 10067 | 0.2 | 20 | 116 | 27 |
| 42 | 12 | 34 | — | 7.5 | 1 | 90 | 4800 | 9796 | — | 10 | — | 32 |
| 43 | 12 | 50 | 0.2 | 7.5 | 1 | 90 | 8800 | 17959 | — | 13 | — | 34 |
| 44 | 13 | 29 | — | 7.5 | 1 | 90 | 3700 | 6046 | 0.15 | 21 | 141 | 26 |
| 45 | 13 | 76 | 0.2 | 7.5 | 1 | 90 | 6800 | 11111 | 0.43 | 47 | 110 | 24 |

TABLE 4

Preparation of supported catalyst components

| Example | EtOH in $MgCl_2$ % by weight | (b) | (b)/V mols/mol | V | Cl | Mg | (b) | Al | EtOH | Solcent |
|---|---|---|---|---|---|---|---|---|---|---|
| 46 | 7.6 | BC | 2.5 | 2.5 | 52.2 | 12.8 | 9.36 | 2.35 | 0.36 | 7 |
| 47 | 7.6 | p-Methoxy BC | 1 | 4.95 | 55 | 14.5 | 9.1 | 2.85 | 4.6 | 1.6 |
| 48 | 6 | BC | 5 | 4.25 | 54.8 | 14.7 | 6.5 | — | 0.3 | 0.8 |

TABLE 5

Ethylene polymerization in slurry - Supported catalysts

| Example | Component of catalysts from Example | Al-alkyl | Al/V mol/mol | $CHCl_3/V$ mol/mol | $P_E$ bar | $P_H$ bar | T °C. | Yield $g/g_{cat}$ | Yield $g/g_vhr$ | IV dl/g | E g/10 min | F g/10 min | F/E | F/P |
|---|---|---|---|---|---|---|---|---|---|---|---|---|---|---|
| 49 | 46 | TIBAL | 233 | — | 7.5 | 1 | 90 | 2500 | 26316 | 1.52 | 2.8 | 157 | 56 | |
| 50 | 46 | TIBAL | 230 | 0.2 | 7.5 | 1 | 90 | 9000 | 94737 | 1.79 | 0.87 | 57 | 66 | |
| 51 | 47 | TIBAL | 271 | — | 7.5 | 1 | 90 | 3000 | 30303 | 1.69 | 1.73 | 104 | 60 | |
| 52 | 47 | TIBAL | 271 | 0.2 | 7.5 | 1 | 90 | 11000 | 111110 | 1.73 | 1.23 | 92 | 75 | |
| 53 | 47 | TNHA | 245 | — | 7.5 | 1 | 90 | 3800 | 38383 | 1.53 | 2.71 | 169 | 62 | |
| 54 | 47 | TNHA | 214 | 0.2 | 7.5 | 1 | 90 | 8255 | 83384 | 1.81 | 0.88 | 72 | 81 | 19 |
| 55 | 47 | DEAC | 257 | — | 7.5 | 1 | 90 | 1200 | 12121 | 2.97 | — | 6 | — | 21 |
| 56 | 47 | DEAC | 257 | 0.2 | 7.5 | 1 | 90 | 1450 | 14646 | 3.16 | — | 5 | — | 20 |
| 57 | 48 | TIBAL | 175 | — | 7.5 | 1 | 85 | 1200 | 14458 | 1.39 | 4.80 | 337 | 70 | 16 |
| 58 | 48 | TIBAL | 168 | 0.3 | 7.5 | 1 | 85 | 3480 | 41928 | 1.52 | 2.40 | 169 | 70 | 17 |
| 59 | 48 | TIBAL | 170 | 0.3 | 7.5 | 1 | 90 | 5900 | 71084 | 1.49 | 1.90 | 139 | 73 | 19 |
| 60 | 48 | TNHA | 90 | — | 7.5 | 1 | 85 | 1912 | 23036 | 1.90 | 0.92 | 67 | 73 | 17 |
| 61 | 48 | TNHA | 82 | 0.3 | 7.5 | 1 | 85 | 2720 | 32771 | 1.66 | 1.60 | 122 | 76 | 18 |
| 62 | 48 | TNHA | 183 | — | 7.5 | 1 | 90 | 2119 | 25530 | 1.55 | 2.20 | 158 | 72 | 17 |
| 63 | 48 | TNHA | 173 | 0.3 | 7.5 | 1 | 90 | 6000 | 72289 | 1.42 | 2.40 | 142 | 59 | 14 |

We claim:

1. Catalysts for the polymerization or copolymerization of alpha-olefins having the formula $CH_2=CHR$, wherein R is hydrogen or an alkyl radical having 1 to 8 carbon atoms, said catalysts comprising the product of a reaction between an aluminum alkyl compound and a catalyst component, said catalyst component having the formula:

$$VCl_y \cdot z(b)$$

wherein (b) represents an organic compound selected from the group consisting of alkyl, aryl and acyl halides, y is a number from 2.5 to 3.5 and z is a number higher than zero and lower than or equal to 2.

2. Catalysts according to claim 1, wherein z is a number from 0.002 to 1.

3. Catalysts according to claim 1, wherein (b) is an acyl halide of a mono- or polycarboxylic aromatic or aliphatic acid.

4. Catalysts according to claim 1 wherein (b) is selected from the group consisting of: benzoyl chloride, p-chlorobenzoyl-chloride, p-methoxy-benzoyl-chloride, phthaloyl chloride, pivaloyl chloride, n-butylperchlorocrotonate and chloroform.

5. Catalysts according to claim 1, wherein the catalyst component is supported on a magnesium halide in spheric form.

6. Catalysts according to claim 5, wherein the magnesium halide is prepared by partially dealcoholating an adduct of $MgCl_2$ and alcohol until the adduct has an alcohol content lower than 10% by weight.

7. Catalysts according to claim 1 wherein the aluminum alkyl compound is an aluminium trialkyl.

8. Catalysts for the polymerization or copolymerization of alpha-olefins having the formula $CH_2=CHR$, wherein R is hydrogen or an alkyl radical having 1 to 8 carbon atoms, said catalysts comprising the product of a reaction between an aluminum alkyl compound and a catalyst component, the catalyst component having the formula:

$$VCl_y \cdot z(b)$$

wherein (b) represents an organic compound selected from the group consisting of alkyl, aryl, and acyl halides, y is a number from 2.5 to 3.5, and z is a number higher than zero and lower than or equal to 2;

the catalysts being prepared by a process comprising the following steps:
(i) reacting vanadium tetrachloride with component (b) at a temperature above 10° C. for period of greater than 1 hour, wherein the molar ratio of component (b) to vanadium is less than 100, to produce a catalyst component; and
(ii) reacting the catalyst component of step (i) with the aluminum alkyl compound.

9. The catalyst of claim 8, wherein the reaction of step (i) occurs at a temperature above 50° C.

10. The catalyst of claim 9, wherein the reaction of step (i) occurs at a temperature between 70° and 130° C.

11. The catalyst of claim 10, wherein the reaction time of step (i) is from 3 to 10 hours.

12. The catalyst of claim 8, wherein the molar ratio of compound (b) to vanadium in step (i) of the process ranges from 0.1 to 30.

13. The catalyst of claim 12, wherein the molar ratio of compound (b) to vanadium in step (i) of the process ranges from 0.3 to 10.

14. The catalyst of claim 8, wherein the concentration of vanadium tetrachloride in step (i) of the process ranges from 0.01 to 3 mols/liter.

* * * * *